Patented May 1, 1951

2,551,125

UNITED STATES PATENT OFFICE 2,551,125

PROCESS OF SULFATING ALKYLOLAMIDES

Ronald A. Henry, Inyokern, Calif., assignor to
The Procter & Gamble Company, Cincinnati,
Ohio, a corporation of Ohio No Drawing. Application December 30, 1947,
Serial No. 794,807

17 Claims. (Cl. 260—401)

The present invention relates to a process of sulfating alkylolamides whereby wetting, foaming and detergent agents are prepared.

Various sulfating procedures have been proposed for producing wetting, foaming and detergent agents from fatty acid amides of alkylolamines, the procedures being in general similar to those practiced in sulfating high molecular alcohols, monoglycerides, olefins and the like. In some processes, a solvent or diluent has been used to check the violence of the reaction, but such a procedure is costly as well as hazardous in a manufacturing process. In other processes, efforts are made to check the violence of the reaction by cooling the system and/or by limiting the rate at which the reactants are added. It has been my experience, however, that when such methods are applied to alkylolamides, results are frequently unsatisfactory, since the chemical instability of alkylolamides and their sulfuric acid esters is so great as to make the reactions hard to control. Side reactions are prone to occur, and these diminish the degree of sulfation and give undesirable products of little or no wetting, foaming or washing power. Thus in sulfating lauric ethanolamide with chlorosulfonic acid, among other side-reactions, a partial conversion of the amide into an ester readily occurs, yielding a lauric acid ester amine hydrochloride of the formula:

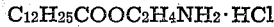

$C_{12}H_{25}COOC_2H_4NH_2 \cdot HCl$ which lacks the desirable properties of the lauric ethanolamide sulfate.

Such undesirable side reactions are accelerated by high temperature and by the presence of acid, and they become more extensive the longer the time during which the acid reaction mixture is held at high temperature. These are conditions which are not readily avoided during sulfation, for an excess of unreacted acid is commonly present during the reaction in order to attain a high degree of completeness of sulfation. If temperature is kept too low, the reaction is slow, and this is objectionable in a manufacturing process since it ties up equipment, limits production and increases costs, but if the temperature is allowed to rise too high, the speed of the side reactions is accelerated, undesirable by-products form, and the amount of sulfated alkylolamide in the product falls. Thus when molten alkylolamide is mixed with a liquid sulfating agent, local overheating at the point of contact can hardly be avoided, and color, completeness of sulfation and quality of finished product suffer. Only by careful temperature control can satisfactorily sulfated alkylolamides be prepared in the absence of a solvent by any previous process known to me. Such control may be exercised by means of refrigeration and/or by slow mixing of the reactants, but these controls involve additional costs in labor, equipment and materials, and limited rate of production.

It is the object of my invention to provide a process whereby high molecular alkylolamides may be sulfated, without substantial undesirable side reactions, to give efficient emulsifying, wetting, foaming and washing agents, and whereby this may be done rapidly, without the use of solvent or inert diluent and without restricting by external or artificial means the temperature attained.

In order to attain a high degree of sulfation, it is common practice to use an excess of sulfuric acid over the amount stoichiometrically required by the alkylolamide to be sulfated. I have found that, especially if this excess is kept at a minimum, undesirable side reactions do not normally occur excessively or rapidly until a temperature of about 100° C. is reached, and this temperature should not be substantially exceeded. If, however, the temperature of the reaction mixture is substantially below 60° C., the viscosity of the system often becomes so high as to make efficient mixing difficult and the reaction may be so slow that the objects of my invention are not fully attained. By maintaining the temperature between these upper and lower limits without the use of external controls but by means to be hereinafter described, by causing the sulfation to take place rapidly, and by prompt and rapid low-temperature neutralization of the sulfation mixture, I have found that I can rapidly attain a high degree of sulfation and obtain a product which is a useful emulsifying, wetting, foaming and washing agent.

In order to sulfate rapidly and at relatively low temperatures, I use solid alkylolamide in finely divided form having a high ratio of surface area to mass. I mix this finely divided solid with a liquid sulfating agent, which may be chlorsulfonic acid, concentrated sulfuric acid or oleum, thereby causing chemical reaction to occur and causing the heat of reaction to be absorbed in large degree in melting the solid amide. The heat of fusion of the amide thus automatically restricts the rise in temperature, which would otherwise be large, and difficult and expensive external temperature control is thereby avoided.

In general, if both the amide and the sulfating agent are initially at normal room temperature, the temperature of the reaction mixture will rise to between about 60° and about 100° C. and the reaction is normally completed within less than 10 minutes. However, adjustment of one or both of the reactants to an initial temperature somewhat above or below normal room temperature, such as from about 10° C. to about 40° C., is not precluded, and such minor preliminary temperature adjustment to afford limited control of the final reaction temperature is possible without departing from the spirit of my invention with respect to absence of substantial external temperature control.

The object of having the solid amide in finely divided form is to give immediate large area of contact with the sulfating acid, thereby causing the reaction to take place speedily and minimizing the time of contact of the amide and of the sulfated amide with acid. In order more fully to attain these ends, I mix the finely divided solid amide as rapidly as possible, without avoidable delay and preferably all at once, with at least the full proportion of acid required in practice to give the desired and predetermined degree of sulfation within less than 10 minutes after the mixing. In case the sulfating agent is chlorsulfonic acid, the molar ratio of acid to amide should preferably be approximately 1:1; but in case weaker sulfating agents are used, higher ratios will commonly be required. Thus with essentially anhydrous sulfuric acid (by which I mean acids containing from about 95 per cent to 100 per cent $H_2SO_4$ by weight), I have practiced my invention satisfactorily with molar ratios of acid to amide varying from about 2.5:1 to about 5:1. In general, I prefer to keep the excess of sulfating agent small, but larger amounts may be used if desired, thereby increasing the maximum degree of sulfation attainable provided the sulfation reaction is checked sufficiently promptly, by neutralization or otherwise, to prevent side reactions from occurring, and also shortening the time required to attain the desired degree of sulfation. Under these conditions, especially with continuous and thorough mixing, the reaction progresses rapidly, the concentration of acid is rapidly decreased, and there is little tendency for undesired side reactions to take place.

Since the undesired side reactions take place especially noticeably after the main reaction is completed, it is an essential feature of my process that the reactions be checked promptly as soon as the desired degree of sulfation has been attained. This can be done by rapid chilling and/or diluting, but prompt and rapid neutralization of the acid sulfation mixture is the preferred method.

It is not imperative, nor is it usually desirable, that the completeness of sulfation should be 100 per cent, i. e., that all of the alkylolamide be converted into its sulfuric acid ester derivative. This is because unsulfated alkylolamides are themselves good builders for the sulfated products, increasing the wetting, foaming, washing and other desirable properties thereof. A degree of sulfation less than total is therefore commonly sought. While I normally prefer that from about 70 per cent to about 90 per cent by weight of the amide be sulfated, yet for some purposes a completeness of sulfation as low as 60 per cent or exceeding 90 per cent is satisfactory. The degree of sulfation attained is a function of several interdependent factors including the nature of the amide and its fineness of subdivision, the nature, amount and concentration of the sulfating agent, the efficiency of mixing, the time elapsed after mixing before neutralizing, the temperature attained and other elements. Table I below illustrates the effect of the amount of sulfating agent, while Table II illustrates the effect of duration of the sulfation reaction. In each case, amide prepared by reacting monoethanolamine with the fatty acids of coconut oil was used in the form of shavings of the order of one-half millimeter in thickness. These shavings were added all at once to the 95.5 per cent sulfuric acid of commerce, both reactants being initially at room temperature. The mixtures were immediately, thoroughly and continuously stirred during reaction and were then rapidly neutralized at the end of the time intervals specified by pouring into well-stirred caustic soda solution containing cracked ice. The figures for "per cent completeness of sulfation" are based upon chemical analysis of the neutralized product.

TABLE I
*Effect of amount of sulfating agent*

| Amide Weight | Acid Weight | Max. Temp. of Sulfation | Time of Sulfation | Completeness of Sulfation |
|---|---|---|---|---|
| Grams | Grams | ° C. | Minutes | Per cent |
| 50 | 50 | 89 | 2 | 67.4 |
| 50 | 60 | 85 | 2 | 75.6 |
| 50 | 85 | 82 | 2 | 79.4 |
| 50 | 95 | 81 | 2 | 82.6 |

TABLE II
*Effect of time of reaction*

| Amide Weight | Acid Weight | Max. Temp. of Sulfation | Time of Sulfation | Completeness of Sulfation |
|---|---|---|---|---|
| Grams | Grams | ° C. | Minutes | Per cent |
| 50 | 75 | 63 | 1 | 60.4 |
| 50 | 75 | 76 | 1.5 | 74.2 |
| 50 | 75 | 78 | 2 | 79.1 |
| 50 | 75 | 78 | 3 | 83.4 |

It will be seen from these tables that in order to attain a desired and predetermined degree of sulfation with sulfuric acid I may within limits either vary the amount of acid and hold the duration of reaction constant, or I may use a fixed amount of acid and vary the length of time that the reaction is allowed to proceed before arresting its course. If the reaction is allowed to proceed unchecked for too long a time, the completeness of sulfation after reaching a maximum again decreases. Sulfation usually occurs so rapidly in my process that there is not sufficient time prior to neutralization for testing by conventional laboratory methods in order to discover when the desired and predetermined degree of completeness of sulfation has been attained. The decision as to when to arrest the reaction by neutralization or otherwise may be based upon previous experience with the particular materials, equipment and procedures used and with the quality of the finished product. The decision as to what degree of sulfation is desired normally depends upon previously performed tests of the quality and efficiency of previously prepared finished products of a generally like nature. Decisions as to the amount of acid and the time of reaction needed to attain this desired degree of sulfation are normally based not upon stoichiometric equivalence of the reactants but rather upon experimentally obtained data such as is shown in Tables I and II. Furthermore, by varying both time and proportion of acid it is possible to control the amount of acid remaining unreacted when the desired degree of sulfation has been attained, and hence the amount of sodium sulfate or other inorganic salt later formed by neutralization.

The nature of the neutralizing agent is not a limitation upon my invention. Caustic soda is most frequently used, but other alkalis, alkaline salts, ammonia or nitrogen bases, heavy metal oxides and hydroxides, alkaline earths and their oxides and the like may be used, subject to the limitation that if the neutralized product is to be used as a wetting, foaming or washing agent the neutralizing agent should be such as to give a water-soluble product. In neutralizing, it may in some cases be advisable to add small amounts of a thinning agent such as methyl alcohol, since otherwise too low a temperature during neutralization may result in a viscous mixture which cannot be mixed well and which may therefore overheat locally, undesirable side reactions resulting therefrom; too high a temperature is likewise to be avoided because of the undesirable side reactions which occur and the decrease in completeness of sulfation. For this reason, temperatures above 70° C. should preferably be avoided during neutralization. The temperature can be prevented from rising too high by mixing cracked ice with, or otherwise refrigerating, the neutralization liquor, or by adding the acid mixture and the neutralizing agent rapidly, in approximately equivalent but relatively small amounts, to a relatively large pre-cooled batch of previously neutralized sulfated alkylolamide, or by other suitable means.

The pH to be reached during neutralization is within limits not critical. Satisfactory products have been obtained by neutralizing to end points lying between 6.2 and 10.5 pH. For some purposes, the neutralized product may be used in paste form, without further treatment, but if a dry product is desired, conventional drying methods, such as roll or spray drying, may be applied in order to obtain a product in flake, powder or other dry form. When the drying is at elevated temperatures, pH values above 10 or below 7 are preferably avoided, lest decomposition occur.

While I have described and illustrated my invention as if it were a batch-wise process, it will be perceived that a continuous process also lies within its scope, wherein continuously flowing streams of finely divided solid alkylolamide and liquid sulfating agent are brought together, the proportion of sulfating agent being at least sufficient to bring about the desired degree of sulfation. Immediately upon contact, these two streams are continuously and thoroughly mixed, allowing the heat of reaction to raise the temperature without substantial externally applied restraint. If both amide and sulfating agent are initially at room temperature, the temperature of the reaction mixture will commonly rise to between 60° C. and 100° C. Any suitable method may be used to cause continuous flow of finely divided solid amide and of sulfating agent. Thus for example, the amide stream may flow by gravity from a storage bin or it may be carried by a conveyer belt or it may be fed by a revolving screw, while the sulfating agent may for example flow by gravity or it may be pumped. It is desirable to use a variable delivery pump in order to regulate the flow of sulfating agent and a constant rate feeder for the solid amide in order thereby to maintain the proper proportion between amide and sulfating agent.

In the continuous process which I have described, the mixture should be allowed to react only long enough to effect the desired degree of sulfation. It is then subjected promptly and continuously to a rapid reaction arresting treatment, as hereinbefore described. Continuous automatic pH control may be provided if desired.

My invention permits rapid and efficient sulfation of high molecular alkylolamides which have the chemical formula

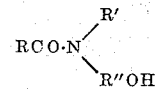

in which RCO is the acyl group of an open chain aliphatic, cyclo-aliphatic or aliphatic-aromatic monocarboxylic acid having from about 8 to about 24 carbon atoms, R' is hydrogen or methyl, and R" is an aliphatic residue, the sum of the number of carbon atoms in R' and R" being not greater than 6.

Some specific alkylolamides which may be sulfated by the process herein described are:

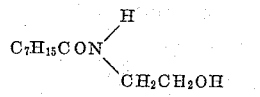
Caprylic amide of monoethanolamine

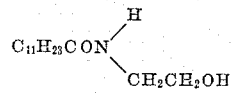
Lauric amide of monoethanolamine

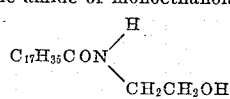
Stearic amide of monoethanolamine

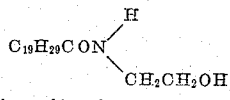
Abietic amide of monoethanolamine

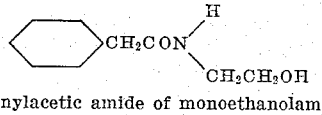
Phenylacetic amide of monoethanolamine

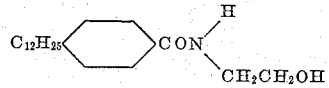
Lauryl benzoic amide of monoethanolamine

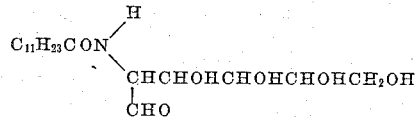
Lauric amide of glucosamine

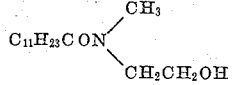
Lauric amide of N-methyl ethanolamine

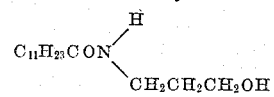
Lauric amide of 3-amino-1-propanol

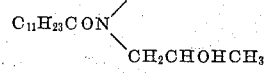
Lauric amide of 1-amino-2-propanol

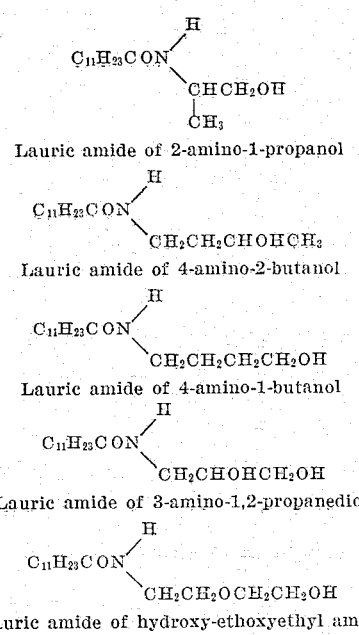

Lauric amide of 2-amino-1-propanol

Lauric amide of 4-amino-2-butanol

Lauric amide of 4-amino-1-butanol

Lauric amide of 3-amino-1,2-propanediol

Lauric amide of hydroxy-ethoxyethyl amine

Instead of employing amides of single acids as indicated above, amides of mixtures of such acids, especially of those mixtures derived from naturally occurring fatty acid esters may be employed. For example, alkylolamides of mixtures of fatty acids derived from oils of the coconut oil group (a group of tropical nut oils characterized by their high content of lauric and myristic acids) such as coconut, palm kernel and babassu oils are of particular value. Corresponding amides of mixtures of other fatty acids derived from other oils and fats such as palm oil, tallow, cottonseed oil, soybean oil, fish oils such as menhaden oil and the like, as well as their hydrogenated or partially hydrogenated derivatives, may also be employed. Corresponding amides of synthetic aliphatic monocarboxylic acids having from about 8 to about 22 carbon atoms may be used, such as may be obtained, for example, by oxidation of paraffin hydrocarbons or petroleum, or by hydrogenation of carbon monoxide (sometimes called the Fischer-Tropsch process) or indirectly by oxidation of the saturated or unsaturated hydrocarbons or oxygenated hydrocarbons resulting from this process. Cycloaliphatic carboxylic acids of from about 8 to about 22 carbon atoms, such for example as naphthenic acids and the acids of rosin and tall oil, may also be used in making the amides to be used in my process. Aliphatic-aromatic acids of from about 8 to about 24 carbon atoms may also be used, such as stearyl benzoic acids.

Oxidation, charring and excessively great rises in temperature frequently occur when highly unsaturated amides are used, and I therefore prefer to use amides of saturated acids or of mixed acids having a high content of saturated acids, such as the mixed acids of naturally occurring fatty esters having an iodine value of less than 50.

As a rule, the alkylolamides of mixed fatty acids are softer and have a lower melting point than those of the individual fatty acids. Thus the ethanolamide of mixed coconut oil fatty acids has a lower melting point than lauric or myristic ethanolamide. The present invention is particularly useful in sulfating high-melting alkylolamides, many of which in the absence of solvent can to the best of my knowledge and belief be satisfactorily sulfated only in the solid form. This is particularly true of those alkylolamides having melting points much above 80° C., for if such amides are premelted and then mixed with the sulfating agent, the local temperature becomes so high as to result in substantial amounts of oxidation and undesirable byproducts.

As hereinbefore pointed out, it is essential to my process that the solid alkylolamide be finely divided in order to obtain high speed of reaction in the presence of minimum excesses of acid and at a suitably low temperature. I have found flakes to be a very convenient form in which to use the amide since they are easily prepared by passing molten amide over cooling rolls and since they can be handled easily and can be mixed with the sulfating agent rapidly. Although flakes, chips or shavings of greater thickness may be used, I prefer that the thickness should in general be less than one millimeter, since more rapid reaction occurs with the thinner flake. The amide need not be in flake form, however. It may alternatively be in the form of powder, granules, seeds, spheres, threads, cylinders, prisms, pyramids or cones or in any other shape or form, regular or irregular. In all cases, however, it is preferred that the size, shape and form of the particles be such that no point within the solid be substantially more than one millimeter from some point on the exterior surface thereof. For example, in the case of flakes, the maximum thickness should not substantially exceed two millimeters, and in the case of spheres or cylinders, the diameter should not substantially exceed two millimeters. It will be understood, of course, that in manufacturing processes, occasional pieces may exceed this limitation, but at least substantially three fourths, by weight, of the amide should come within these dimensional limitations, and when the term "finely divided form" is used herein, these limitations are to be understood thereby.

The following examples illustrate in greater detail ways in which I may practice my invention, but is is to be understood that my invention is not limited to the scope of the examples but only to the scope of the appended claims. In all examples, the reagents were initially at about 25° C. unless otherwise noted, and no external temperature control was applied.

*Example 1.*—The ethanolamide of mixed coconut oil fatty acids was prepared in the form of thin shavings, one-half millimeter or less in thickness. Fifty grams of the shavings was added all at once to 75 grams of 99.6% sulfuric acid. Mechanical agitation was immediate, vigorous and continuous for 2.5 minutes, during which time the temperature of the sulfation batch rose to 91° C. The acid mixture was then poured rapidly, with stirring, into 191 grams of a 27.85% sodium hydroxide solution containing 300 grams of crushed ice, the maximum temperature reached in this neutralization batch being 35° C. Final adjustment to a pH of 7.5 was made with 2.14 normal sulfuric acid. The resulting product was water-soluble, foamed freely, possessed both wetting-out and emulsifying properties and was a powerful detergent. Analysis indicated that 83.2% of the amide had been sulfated.

*Example 2.*—Fifty grams of the coconut oil fatty acid amide of monoethanolamine was shaved thin as in Example 1 and was added all at once to 75 grams of 95.5% sulfuric acid while the latter was being stirred vigorously. Stirring was continued for 3 minutes, during which time the temperature rose to 78° C. The mixture was then poured rapidly, with stirring, into 183.4 grams of 27.85% sodium hydroxide solution containing 300 grams of cracked ice, the maximum temperature reached during neutralization being 32° C. Final adjustment to a pH of 7.5 was made with 2.14 normal sulfuric acid. The resulting product was water-soluble, foamed freely, possessed wetting-out and emulsifying power and was a powerful detergent. Analysis indicated that 83.7% of the amide had been sulfated.

*Example 3.*—Fifty grams of the ethanolamide of the mixed fatty acids of tallow was shaved thin as in Example 1 and was added all at once, with vigorous stirring, to 75 grams of 95.5% sulfuric acid. Stirring was continued for 3.5 minutes during which time the temperature rose to 73° C. The mixture was then poured rapidly, with stirring, into 140 milliliters of 27.2% sodium hydroxide solution containing 200 grams of cracked ice, the maximum temperature reached during neutralization being 50° C. A 0.5% solution of the resulting paste had a pH of 8.6 and was clear at temperatures above 40° C. Analysis indicated that 76.4% of the amide was sulfated. The product possessed good washing power and moderately good sudsing properties.

*Example 4.*—Fifty grams of the amide of 3-amino-1,2-propanediol with mixed coconut fatty acids was powdered and was added all at once to 75 grams of vigorously stirred 95.5% sulfuric acid. Stirring was continued for 3 minutes, during which time the temperature rose to 67° C. The rate at which the amide melted and dissolved was slower and the resulting paste was thicker than in the case of the corresponding coconut fatty acid amide of ethanolamine of Example 2. After stirring for 3 minutes the mixture was poured rapidly, with stirring, into 140 milliliters of 27.2% sodium hydroxide solution containing 100 grams of ice. Approximately 10 milliliters of methyl alcohol was added during neutralization in order to thin the paste. The final pH was adjusted to between 7.5 and 8.0. The resulting paste gave a clear 0.5% solution in water at temperatures above 30° C. and possessed good foaming, wetting, emulsifying and washing properties. Analysis indicated that 92.5% of the amide had been sulfated.

*Example 5.*—Fifty grams of the isopropanolamide of mixed coconut oil fatty acids was shaved very thin and was added all at once to 75 grams of 95.5% sulfuric acid while vigorously stirring the latter. Stirring was continued for 1.5 minutes during which time the temperature rose to 81° C. The sulfation mixture, which was more fluid than was the corresponding coconut ethanolamide sulfation mixture of Example 2, was then poured rapidly, with stirring, into 180 grams of 28% sodium hydroxide containing 200 grams of cracked ice, the maximum temperature reached during this neutralization being 56° C. The resulting thin paste flowed readily, dissolved to a clear 0.5% solution even in cold water, was a good detergent and sudsed freely. Analysis indicated that 70.5% of the amide had been sulfated.

*Example 6.*—Fifty grams of myristic ethanolamide, in the form of thin shavings, was added rapidly with vigorous stirring to 22 grams of chlorsulfonic acid, thirty seconds being required for the addition. Stirring was continued for 2 minutes, following which the product was neutralized by pouring rapidly, with stirring, into a solution of 9.2 grams of sodium hydroxide in 30 milliliters of water to which 50 grams of cracked ice was added. Analysis of the resulting thick gelatinous paste indicated that 87.9% of the amide had been sulfated. The product possessed good foaming, wetting and washing properties.

*Example 7.*—50.4 grams of thinly shaved ethanolamide of mixed coconut oil fatty acids was added all at once to 24.4 grams of chlorsulfonic acid. Stirring of the mixture was immediate and vigorous and continued for 2.5 minutes, during which time the temperature rose to 75° C. Ten milliliters of methyl alcohol was added to thin the paste, and the pH was then adjusted to between 7.0 and 7.5 by adding 34° Bé. caustic soda solution containing ice, the temperature during neutralization remaining below 30° C. The resulting paste gave a clear 0.5% solution in water, foamed freely and cleaned efficiently. Analysis indicated that 82.3% of the amide had been sulfated.

Having thus described my invention, what I claim and desire to secure by Letters Patent is:

1. A process of sulfating alkylolamides of the composition

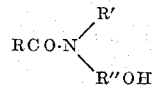

wherein RCO· is an acyl radical of an acid of the group consisting of open-chain aliphatic, cyclo-aliphatic, and aliphatic-aromatic monocarboxylic acids having from about 8 to about 24 carbon atoms, R' is a member of the group consisting of hydrogen and methyl, and R'' is an aliphatic residue, the sum of the number of carbon atoms in R' and R'' being not greater than 6, which process comprises rapidly mixing the amide at normal room temperature and in the form of solid particles of such size that no point therewithin is substantially more than one millimeter from the exterior surface thereof, with a liquid sulfating agent at normal room temperature and in predetermined amount at least sufficient in practice to bring about the desired degree of sulfation within 10 minutes after mixing, permitting the mixture to react chemically without substantially restraining by external means the rise in temperature due to chemical reaction, during which reaction the temperature rises to between 60° and 100° C., and promptly subjecting the acid reaction mixture to a rapid reaction-arresting treatment as soon as the desired degree of sulfation has been attained.

2. The process of claim 1 in which the initial temperatures of the reactants are so adjusted between about 10° C. and about 40° C. that the maximum temperature of the mixture during sulfation shall be between about 60° C. and about 100° C.

3. The process of claim 1 wherein the reaction is arrested when the desired degree of sulfation has been attained by promptly and rapidly neutralizing the acid reaction mixture with an alkaline agent which forms a water-soluble compound with the sulfation reaction product.

4. The process of claim 1 wherein the acid reaction mixture is neutralized to a pH of from about 7 to about 10.

5. The process of claim 1 in which the temperature during neutralization is not allowed to exceed 70° C. substantially.

6. The process of claim 1 wherein the sulfating agent is chlorsulfonic acid, used in an amount equal to approximately one molar weight of acid to one molar weight of alkylolamide.

7. The process of claim 1 wherein the sulfating agent is essentially anhydrous sulfuric acid, used in an amount such that the molar ratio of acid to alkylolamide is between about 2.5:1 and about 5:1.

8. The process of claim 1 in which the acid portion of the alkylolamide comprises fatty acids of naturally occurring fatty acid esters.

9. The process of claim 1 in which the acid portions of the alkylolamide comprises fatty acids of naturally occurring fatty acid esters having iodine value less than 50.

10. The process of claim 1 in which the acid portion of the alkylolamide comprises fatty acids of oils of the coconut oil group.

11. The process of claim 1 in which the acid portion of the alkylolamide comprises fatty acids of coconut oil.

12. The process of claim 1 in which the alkylolamide is derived from monoethanolamine.

13. The process of claim 1 in which the alkylolamide is derived from 3-amino-1,2-propanediol.

14. The process of claim 1 in which the alkylolamide is derived from 3-amino-1-propanol.

15. The process of sulfating an alkylolamide of the formula given in claim 1, wherein RCO· is the acyl radical of fatty acids of oils of the coconut oil group, which process comprises rapidly mixing the said amide at a temperature between about 10° C. and about 40° C. and in the form of solid particles of such size that no point therewithin is substantially more than one millimeter from the exterior surface thereof, with a liquid sulfating agent at a temperature between about 10° C. and about 40° C. and in an amount predetermined to be sufficient in practice to bring about the sulfation of between about 70 per cent and about 90 per cent by weight of the amide within 10 minutes after mixing, permitting these substances to react without substantial external temperature control until between about 70 per cent and about 90 per cent by weight of the amide is sulfated but for not longer than 10 minutes after mixing, during which time the temperature rises to between 60° and 100° C., and promptly thereafter rapidly neutralizing the acid mixture with caustic soda to a pH of from about 7 to about 10 while restraining the temperature from rising substantially above 70° C.

16. The process of sulfating an alkylolamide of the formula given in claim 1, wherein RCO· is the acyl radical of fatty acids of oils of the coconut oil group, which process comprises rapidly mixing the said amide at a temperature between about 10° C. and about 40° C. and in the form of solid particles of such size that no point therewithin is substantially more than one millimeter from the exterior surface thereof, with chlorsulfonic acid at a temperature between about 10° C. and about 40° C. and in an amount equal to approximately one molar weight of acid to one molar weight of amide, permitting these substances to react chemically without substantial external temperature control until between about 70 per cent and about 90 per cent by weight of the amide is sulfated but for not longer than 10 minutes after mixing, during which time the temperature rises to between 60° and 100° C., and promptly thereafter rapidly neutralizing the acid mixture with caustic soda to a pH of from about 7 to about 10 while restraining the temperature from rising substantially above 70° C.

17. The process of sulfating an alkylolamide of the formula given in claim 1, wherein RCO· is the acyl radical of fatty acids of oils of the coconut oil group, which process comprises rapidly mixing the said amide at a temperature between about 10° C. and about 40° C. and in the form of solid particles of such size that no point therewithin is substantially more than one millimeter from the exterior surface thereof, with essentially anhydrous sulfuric acid at a temperature between about 10° C. and about 40° C. and in an amount such that the molar ratio of acid to amide is between about 2.5:1 and about 5:1, permitting these substances to react chemically without substantial external temperature control until between about 70 per cent and about 90 per cent by weight of the amide is sulfated but for not longer than 10 minutes after mixing, during which time the temperature rises to between 60° and 100° C., and promptly thereafter rapidly neutralizing the acid mixture with caustic soda to a pH of from about 7 to about 10 while restraining the temperature from rising substantially above 70° C.

RONALD A. HENRY.

REFERENCES CITED

The following references are of record in the file of this patent:

UNITED STATES PATENTS

| Number | Name | Date |
|---|---|---|
| 2,312,896 | Graenacher et al. | Mar. 2, 1943 |
| 2,353,081 | Robinson et al. | July 4, 1944 |